United States Patent [19]

Partovi et al.

[11] Patent Number: 5,353,424
[45] Date of Patent: Oct. 4, 1994

[54] FAST TAG COMPARE AND BANK SELECT IN SET ASSOCIATIVE CACHE

[75] Inventors: Hamid Partovi, Westboro; William R. Wheeler, Hudson; Michael Leary, Jefferson; Michael A. Case, Grafton; Steven Butler, Marlboro; Rajesh Khanna, Westboro, all of Mass.

[73] Assignee: Digital Equipment Corporation, Maynard, Mass.

[21] Appl. No.: 794,865

[22] Filed: Nov. 19, 1991

[51] Int. Cl.$^5$ .................................... G06F 12/08
[52] U.S. Cl. ............................ 395/425; 395/400; 364/DIG. 1; 364/246.1; 364/246.4; 364/248.4; 364/955
[58] Field of Search ... 364/200 MS File, 900 MS File; 395/400 MS File, 425 MS File

[56] References Cited

U.S. PATENT DOCUMENTS

| | | | |
|---|---|---|---|
| 4,783,736 | 11/1988 | Ziegler et al. | 395/425 |
| 4,914,577 | 4/1990 | Stewart et al. | 395/400 |
| 4,953,073 | 8/1990 | Moussouris et al. | 395/400 |
| 5,014,195 | 5/1991 | Farrell et al. | 364/200 |
| 5,148,536 | 9/1992 | Witek et al. | 395/425 |
| 5,210,843 | 5/1993 | Ayers | 395/425 |

OTHER PUBLICATIONS

O'Connor et al., "Modular Embedded Cache Memories for a 326 Pipeline RISC Microprossor", ISSCC 87, Feb. 27, 1987, pp. 256–257.
Suzuki et al, "A 19ns Memory", ISSCC 87, Feb. 26, '87, pp. 134–135 and 368.
Ooi et al, "Fail–Soft Circuit Design in a Cache Memory Control LSI", ISSCC 87, Feb. '87, pp. 103–104 and 91–92.
Nogami et al, "A 0.5W 64kB Snoopy Cache Memory with Flexible Expandability", ISSCC 91, Feb. 15, '91, pp. 266–267 and 327.
Watanabe, "An 8Kbyte Intelligent Cache Memory", ISSCC 87, Feb. 27, '87, pp. 266–267.

Primary Examiner—Joseph L. Dixon
Assistant Examiner—Reba I. Elmore
Attorney, Agent, or Firm—Richard J. Paciulan; Denis G. Maloney

[57] ABSTRACT

A tag comparator and bank selector for a set-associative cache in a computer system operates in a minimum time so that a cache hit or miss signal is generated early in a memory cycle. The data memory of the cache has two (or more) banks, with a tag store for each bank, and the two banks are accessed separately and in parallel using the index (low order address bits) while the tag translation is in progress. Two bit-by-bit tag compares are performed, one for each tag store, producing two multi-bit match indications, one bit for each tag bit in each tag store. These two match indications are applied to two separate dynamic NOR gates, and the two outputs applied to a logic circuit to detect a hit and generate a bank-select output. There are four possible outcomes from the compare operation: both banks miss, left bank hits, right bank hits, and both banks hit. The later condition indicates a possible ambiguity, and neither data item should be used, so a miss is signalled. The comparator is in large part self-timed using a flow-through design, as distinguished from being enabled on clock edges. Delay elements in the bank select logic allow the banks to be timed against each other, and current limiters are employed to equalize the timing of miss signals, regardless of the number of match lines switching high (which is data dependent). An address producing 19-of-20 match bits will result in a NOR gate output of about the same timing as an address producing no match bits, even though the former will turn on only one transistor to discharge the precharged output node of the NOR gate, whereas the later will turn on twenty paths for discharge. Although a two-way set associative cache is shown herein as an example embodiment, one of the features of the invention is that higher levels of associativity, e.g., four-way and eight-way, are equally well accommodated.

15 Claims, 6 Drawing Sheets

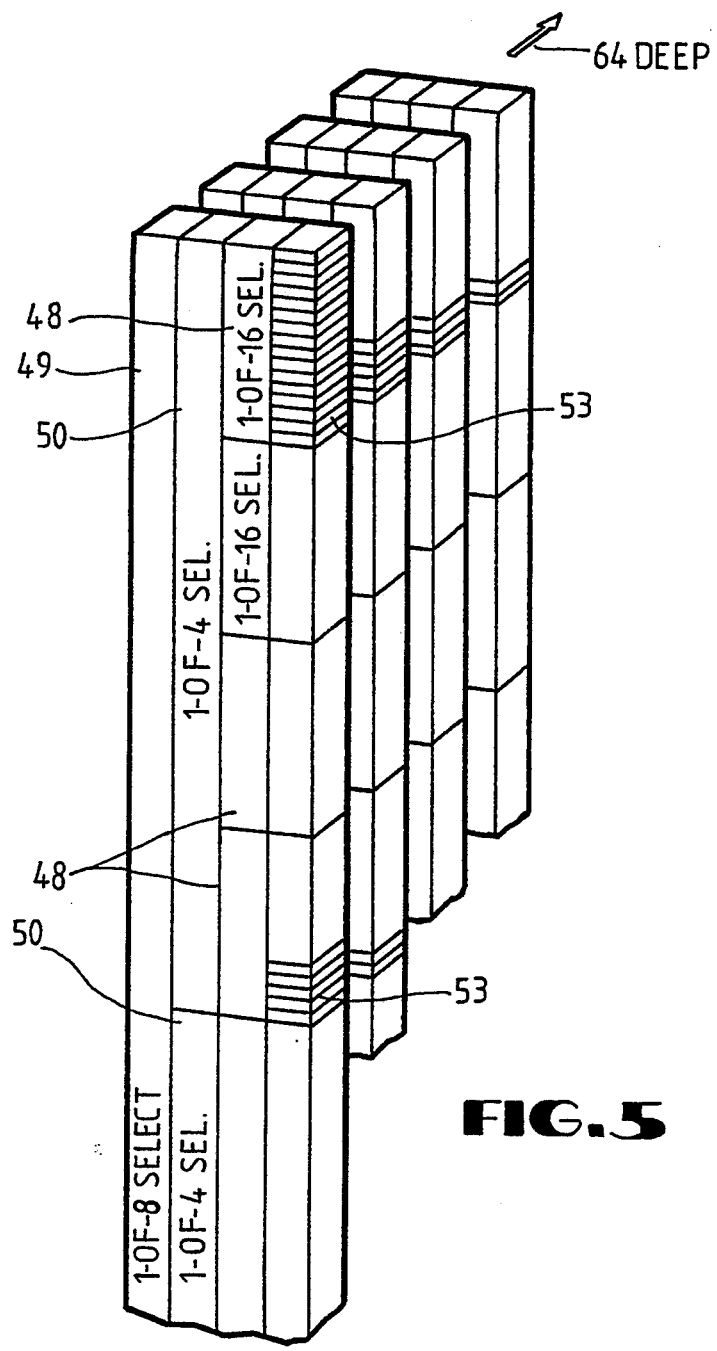
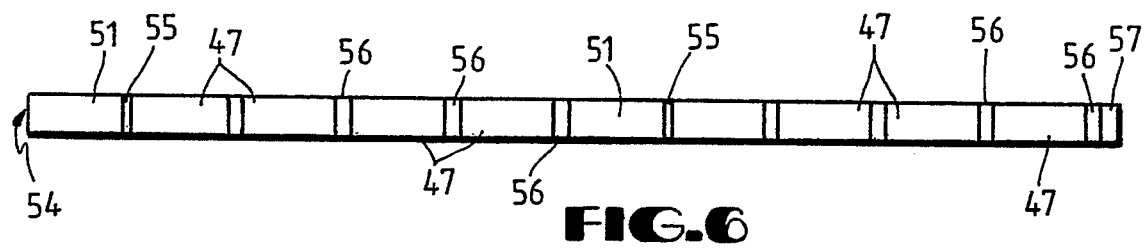

FAST TAG COMPARE AND BANK SELECT IN SET ASSOCIATIVE CACHE

BACKGROUND OF THE INVENTION

This invention relates to computer operation, and more particularly to a method of increasing the speed of tag comparison in the operation of a set-associative cache.

The performance of CPUs has far outstripped memory system performance, as the development of computer hardware technology continues. Caches, which are small, fast memories a fraction of the size of main memory, are used to decrease the effective memory access times. A cache stores a copy of recently-used data for rapid access should the data be needed again, and, for many programs, a cache greatly improves the processing speed of the computer system.

In selecting a cache construction for a computer, an important decision is whether to use a direct-mapped or an associative cache. If a data item (having a given address) has only one place it can appear in the cache, the cache is "direct mapped." If the item can be placed anywhere in the cache, the cache is "fully associative." If the item can be placed in only a fixed number (a set) of places in the cache, the cache is "set associative." If there are n locations in a set, the cache is "n-way set associative." Typically, two-way or four-way (and sometimes eight-way) are the number of locations per set used in this type of cache. An associative cache has a lower miss rate, but can introduce a performance penalty.

A direct-mapped cache is the simplest and fastest construction, but severely limits the number of cache locations where a particular data item can reside. A direct-mapped cache has only one location where a data item of a given index address may be stored. When two or more heavily used data items map to the same cache location in a direct-mapped cache, and these data items are used by a program in a cyclic manner, as in a loop, cache thrashing occurs. As each data is used, it displaces its predecessor, causing a relatively slow main memory access. Cache thrashing can severely degrade program run times by forcing many main memory accesses, and it also increases the system interconnect bandwidth required by a system to obtain reasonable performance.

Set-associative cache constructions increase the probability of finding recently-used data in the cache. By providing two or more location in cache where a data item having a given index (low-order address) may be stored, cache misses are reduced and thrashing will not be as frequent. Set-associative caches are inherently slower in operation than direct-mapped caches, however. Since a set associative cache allows a given address value to be mapped to more than one location in a cache array, two or more addresses from different pages having a corresponding set of address bits (the index) equal can exist in the cache at the same time. The hardware for implementing a direct-mapped cache is faster in operation, however, compared to a set-associative cache, because data can be driven onto the bus while a hit or miss is being determined, as opposed to a set associative cache where the correct data cannot be driven onto the bus unless a hit is determined. In a set-associative cache, the tag address must be compared with a number of possible matches, and then the corresponding data from two or more banks also selected (after the tag compare is completed); this additional step of bank selection necessarily makes the operation slower. Indeed, to allow for this added time, the cycle time of the CPU may be slightly increased, affecting the performance of the entire system.

High performance computer systems usually employ virtual memory management, which introduces a delay in memory addressing while the virtual address is translated to a physical address. An on-chip cache for a microprocessor chip is thus constrained in its response time by the requirement for translating the addresses, usually by an on-chip translation buffer, before the cache can be accessed to see if it contains the data of a memory reference. Waiting to begin the tag compare until after the translation buffer has produced a page frame address in a virtual memory management system thus places further performance demands upon the compare and bank select operation in a set-associative cache.

Various circuit improvements have been used to speed up the compare operation in set-associative caches to attempt to keep pace with the improvements in CPU cycle times. The goal is to be able to access the primary cache (in a hierarchical memory) in one CPU cycle, and, in case of a cache miss in the primary cache, complete the access to the secondary cache in one or two cycles. This requires the miss to be detected at as early as possible in the access cycle, i.e., as soon as possible after the tag becomes available. The technology of semiconductor manufacturing and circuit design is reaching the level where 100-Mhz (and above) clocks are possible, providing 10-nsec CPU cycle times.

In an article by Suzuki et al, "A 19 ns Memory," ISSCC 87, p. 134, a tag memory for a high-speed SRAM cache is disclosed which employs a comparator with CMOS match circuits and an NMOS NOR gate for generating a hit signal. The Suzuki et al compare circuit, however, does not provide an early bank select signal, and the hit signal is data dependent, i.e., its timing is different depending upon the number of matched bits in the tag address. Further, the Suzuki et al circuit, if this were to be used for an associative cache, must be conditioned to a clock edge since the hit signal is asserted to begin with. Also, since the Suzuki et al cache is direct mapped, no provision is made for detecting multiple hits. A cache having multiple-hit detection is shown in an article by Ooi et al, "Fail-Soft Circuit Design in a Cache Memory Control LSI," ISSCC 87, p. 103, but this circuit requires a separate logic unit to provide this function, and introduces a further delay in the compare operation.

SUMMARY OF THE INVENTION

In accordance with one embodiment of the invention, a tag comparator for a set-associative cache in a computer system is constructed to operate in a minimum time so that a cache miss signal is generated early in a memory cycle. The data memory of the cache has two (or more) banks, with a tag store for each bank, and the two banks are accessed separately and in parallel using the index (low order address bits) while the tag translation is in progress in a TLB. Two bit-by-bit compares are performed, one for each tag store, where the tag field of the physical address from the CPU is compared with the stored value, producing two multibit match indications, one bit for each tag bit in each tag store. These two match indications are applied to two separate dynamic NOR gates, and the two outputs applied to a logic circuit to generate a bank-select output. There are four possible outcomes from the compare operation: both banks produce a miss, left bank produces a hit, right bank produces a hit, and both banks produce a hit. The hit-in-both-banks condition indicates a possible ambiguity, and neither data item should be used, so a miss should be signalled. A feature of the comparator of the invention is that the condition of a hit in both banks is detected and a miss signalled with no additional logic circuitry and no delay. Another feature is that the comparator is in large part self-timed using a flow-through design (the banks are timed against each other), as distinguished from being enabled on clock edges. In this manner, the compare and bank select operation can proceed as each stage is completed, rather than waiting for a clock designed to accommodate worst-case timing, and so the overall average speed is enhanced. Delay elements in the bank select logic allow the banks to be timed against each other, and current limiters are employed to equalize the timing of miss signals, regardless of the number of match lines switching high (which is dependent upon the number of miscompares, one to twenty). Thus, an address producing 19-of-20 match bits will result in a NOR gate output of about the same timing as an address producing 0-of-20 match bits, even though the former will turn on only one transistor to discharge the precharged output node of the NOR gate, whereas the later will turn on twenty paths for discharge. Although a two-way set associative cache is shown herein as an example embodiment, one of the features of the invention is that higher levels of associativity, e.g., four-way and eight-way, are equally well accommodated.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 5 is another diagram of the cache array of FIG. 4, shown in a pictorial layout;

FIG. 6 is a diagram of a cache line used in the cache of FIGS. 4 and 5;

DETAILED DESCRIPTION OF SPECIFIC EMBODIMENT

Figure 1:
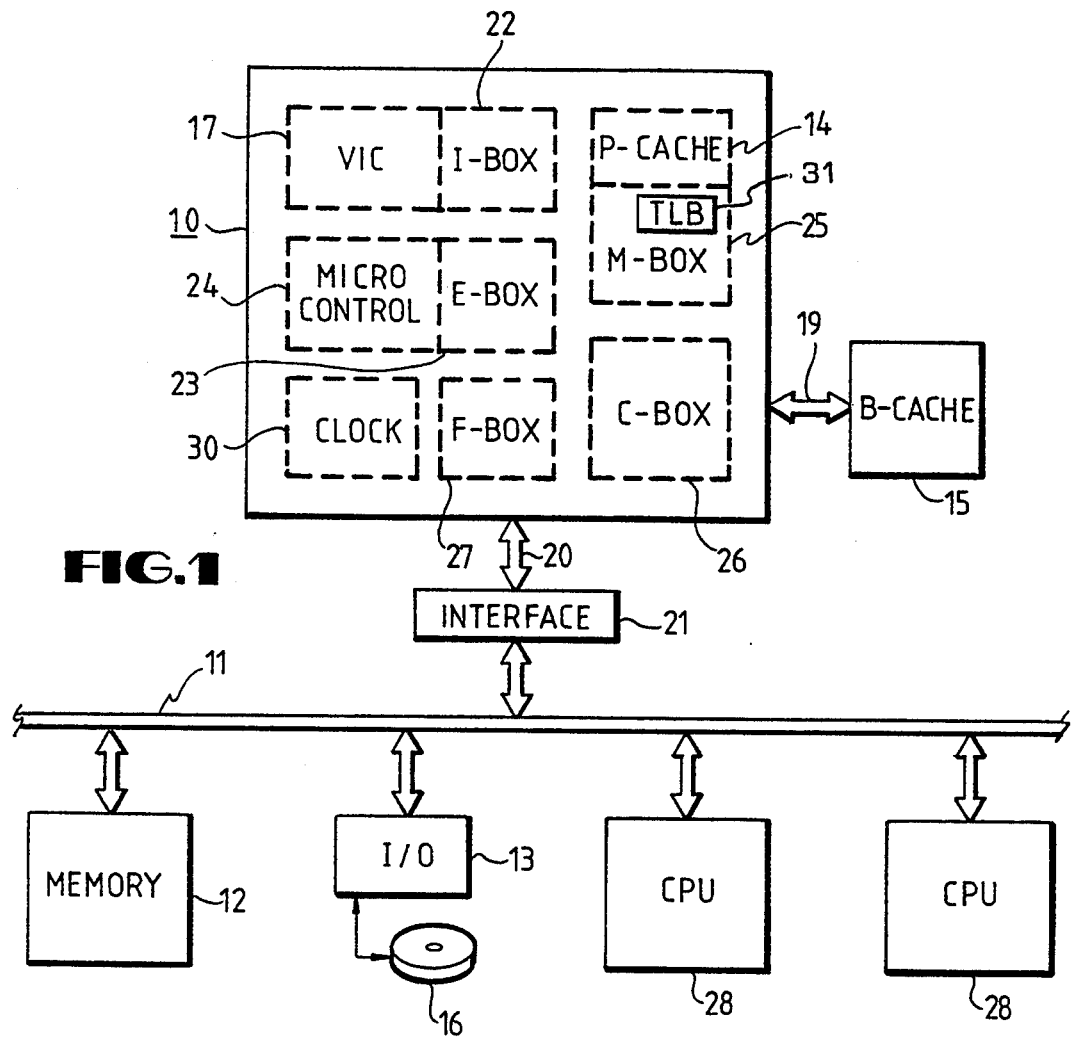
FIG. 1 is an electrical diagram in block form of a computer system which may employ a cache compare and bank select circuit according to one embodiment of the invention.

Referring to FIG. 1, according to one example embodiment, a computer system employing features of the cache control of the invention includes a CPU chip or module 10 of the type disclosed in copending application Ser. No. 547,824, filed Jun. 29, 1990 by William Wheeler et al, assigned to Digital Equipment Corporation, the assignee of this invention. The CPU 10 in this example is connected by a system bus 11 to a system memory 12 and to I/O elements 13. Although in a preferred embodiment the cache control of the invention is used for an on-chip cache for a CPU 10 formed on a single integrated circuit, some concepts as described below may be implemented as a chip set mounted on a single circuit board or multiple boards. When fetching instructions or data, the CPU 10 accesses an internal or primary cache 14 which uses the cache control concepts of the invention as will be described. When the memory reference is not found in the primary cache, then a larger external (off-chip) or backup cache 15 is accessed. This provides a hierarchical memory, the fastest being the primary cache 14, then the backup cache 15, then the main system memory 12, usually followed by a disk memory 16. The disk is accessed employing an operating system (i.e., software) for paging and virtual memory management. A virtual memory organization employs pages stored on disk 16 and brought to the physical memory 12 by the operating system to keep the most-likely-to-be-used pages in the memory 12. An additional cache 17 in the CPU 10 stores instructions only, using virtual addresses instead of physical addresses. Physical addresses are used for accessing the primary and backup caches 14 and 15, and used on the bus 11 and in the memory 12. When the CPU 10 fetches an instruction, first the virtual instruction cache 17 is checked, and if a cache miss occurs the address is translated to a physical address and the primary cache 14 is checked. If the instruction is not in the primary cache, the backup cache 15 is next, and upon a cache miss in the backup cache the memory 12 is accessed. Data is similarly accessed in the hierarchical memory system, but here nothing corresponding to the virtual instruction cache is provided for data. The primary cache 14 is smaller but faster than the backup cache 15, and the content of the primary cache 14 is a subset of the content of the backup cache 15. The virtual instruction cache 17 differs from the operation of the other two caches 14 and 15 in that there are no writes to the cache 17 from the CPU 10 except for cache fill operations when instructions are fetched from memory, and also the content of this cache 17 need not be a subset of the content of the caches 14 or 15, although it may be.

The CPU 10 accesses the backup cache 15 through a bus 19, separate from a CPU bus 20 used to access the system bus 11; thus, a cache controller for the backup cache 15 is included within the CPU chip. Both the CPU bus 20 and the system bus 11 are 64-bit bidirectional multiplexed address/data buses, accompanied by control buses containing request, grant, command lines, etc. The bus 19, however, has a 64-bit data bus and a separate address bus. The system bus 11 is interconnected with the CPU bus 20 by an interface unit 21 functioning to arbitrate access by the CPU 10 and the other components on the CPU bus 20.

The CPU 10 includes an instruction unit 22 (referred to as the I-box) functioning to fetch macroinstructions (machine-level instructions) and to decode the instructions, one per cycle, and parse the operand specifiers, then begin the operand fetch. The data or address manipulation commanded by the instructions is done by an execution unit or E-box 23 which includes a register file and an ALU. The CPU is controlled by microcode so a microinstruction control unit 24 including a microsequencer and a control store is used to generate the sequence of microinstructions needed to implement the macroinstructions. A memory management unit or M-box 25 receives instruction read and data read requests from the instruction unit 22, and data read or write requests from the execution unit 23. Address translation is performed in the M-box 25 using a TLB to generate physical addresses from virtual addresses. The M-box issues memory requests to the P-cache 14, or in the case of a P-cache miss, forwards the requests to the backup cache 15 via a cache controller or C-box 26. This cache controller 26, separate from the cache controller for the P-cache (as will be described below) handles access to the backup (second level) cache 15 in the case of a P-cache miss, or access to the main memory 12 via bus 20 for backup cache misses. An on-chip floating point processor 27 (referred to as the F-box) is an execution unit for floating point and integer multiply instructions, receiving operands and commands from the execution unit 23 and delivering results back to the execution unit.

Although features of the cache control of the invention may be used with various types of CPUs, the disclosed example of a CPU is of the VAX TM architecture, which is described by Levy and Eckhouse in "Computer Programming and Architecture: The VAX", 2nd Ed., Digital Press, 1989, which is incorporated herein by reference. The CPU 10 may be of the VAX TM type as disclosed by in the Levy et al text or in U.S. Pat. No. 5,006,980, issued to Sander, Uhler & Brown, assigned to Digital Equipment Corporation, the assignee of this invention.

Even though the example embodiment of a CPU described herein is of the VAX architecture, nevertheless features of the cache control of the invention are useful as well in processors constructed of other architectures, such as those for 80386 or 68030 types. Also, instead of computers of the complex instruction set (CISC) type as herein disclosed, the features are useful in reduced instruction set computers (RISC) such as the MIPS R3000 or the advanced 64-bit RISC architecture disclosed in copending application Ser. No. 547,630, filed Jun. 29, 1990, also assigned to Digital Equipment Corporation.

Additional CPUs 28 may access the system bus 11 in a multiprocessor system. Each additional CPU can include its own CPU chip 10, primary cache 14, backup cache 15 and interface unit 21, if these CPUs 28 are of the same design as the CPU 10. Alternatively, these other CPUs 28 may be of different construction but executing a compatible bus protocol to access the main system bus 11. These other CPUs 28 can access the memory 12, and so the blocks of data in the caches 14 or 15 can become obsolete. If a CPU 28 writes to a location in the memory 12 that happens to be duplicated in the primary cache 14 (or in the backup cache 15), then the data at this location in the cache is no longer valid. For this reason, blocks of data in the caches 14 and 15 are invalidated when there is a write to memory 12 from a source other than the CPU 10 (such as the other CPUs 28). The primary cache 14 operates on a "write-through" principle, whereas the cache 15 operates on a "writeback" principle. When the CPU 10 executes a write to a location which happens to be in the primary cache 14, the data is written to this cache 14 and also to the backup cache 15 (and sometimes also to the memory 12, depending upon conditions); this type of operation is "writethrough". When the CPU 10 executes a write to a location which is in the backup cache 15, however, the write is not necessarily forwarded to the memory 12, but instead is written back to memory 12 only if another element in the system (such as a CPU 28) needs the data (i.e., tries to access this location in memory), or if the cache line in the cache is displaced (deallocated) from the cache 15.

Figure 2:
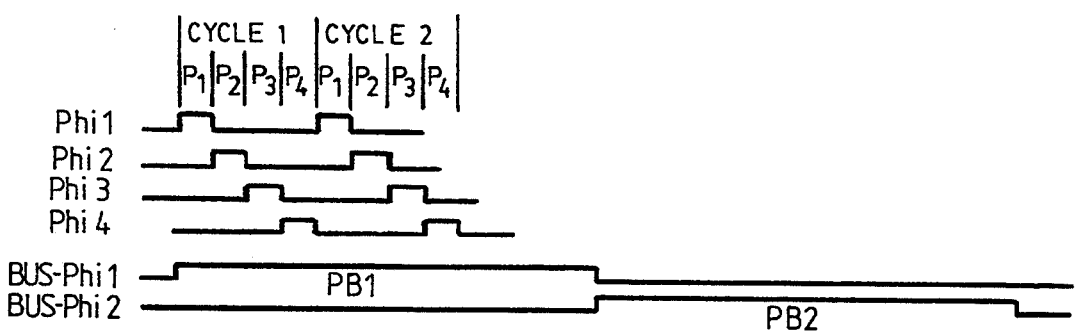
FIG. 2 is a timing diagram of the four-phase clocks produced by a clock generator in the CPU of FIG. 1 and used within the CPU, along with a timing diagram of the external bus cycle and clocks used to define the external bus cycle in the system of FIG. 1.

Referring to FIG. 2, a clock generator 30 in the CPU chip 10 of FIG. 1 generates four non-overlapping clocks phi1, phi2 phi3 and phi4 used to define four phases of a machine cycle. In an example embodiment, the machine cycle is nominally 10-nsec (100 MHz), so the clocks phi1, etc., operate at 2.5-nsec each. The primary cache 14 should deliver read data back to the M-box 25 within a single machine cycle, and the decision of cache-miss or cache-hit should be made in much less than a machine cycle so that the data access can be completed if a hit or commands can be passed on to the backup cache in the case of a miss. The external busses 19 and 20 operate on a bus cycle which is three times longer than the machine cycle of the CPU, so in this example the external bus cycle, also shown in FIG. 2, is nominally 30-nsec. The bus cycle is likewise defined by four overlapping clocks Phi1, Phi2, Phi3 and Phi4 produced by the clock generator 30 serving to define four phases of the bus cycle. The system bus 11, however, operates on a longer bus cycle of about twice as long as that of the bus 20, e.g., about 64-nsec, and this bus cycle is asynchronous to the CPU 10 and bus 20. The timing cycle of the system bus 11 is controlled by a clock generator in the interface unit 21.

The internal construction of the CPU chip 10 is illustrated in general form in FIG. 1. The instruction unit 22 includes the virtual instruction cache 17 which is a dedicated instruction-stream-only cache of perhaps 2-Kbyte size, in one example, storing the most recently used blocks of the instruction stream, using virtual addresses rather than physical addresses. Physical addresses are used for accessing the caches 14 and 15 (and the main memory 12). That is, an address for accessing the virtual instruction cache 17 does not need address translation in a TLB 31 as is done in the memory management unit 25 for other memory references. Instructions are loaded from the instruction cache 17 to a prefetch queue, from which instructions are taken for decoding.

The microinstruction control unit 24 contains a microsequencer selecting microwords to be fetched from a control store. The control store is a ROM producing a microcode word each machine cycle, in response to an address generated by the microsequencer. The microsequencer receives an entry point address from the instruction unit 22 to begin a microroutine dictated by the macroinstruction. The execution unit 23 (under control of the microinstruction control unit 24) performs the actual "work" of the macroinstructions. A register file contained in the execution unit 23 includes general purpose registers, a program counter, memory data registers, temporary or working registers and state registers. The execution unit 23 also contains an ALU and a shifter to perform the operation commanded by the macroinstructions received from the microsequencer.

The memory management unit 25 receives read requests from the instruction unit 22 (both instruction stream and data stream) and from the execution unit 23 (data stream only), and the memory management unit 25 delivers memory read data to either the instruction unit 22 or the execution unit 23. The memory management unit 25 also receives write/store requests from the execution unit 23, as well as invalidates, primary cache 14 fills and returns data from the cache controller unit 26. The memory management unit 25 arbitrates between these requesters, and queues requests which cannot currently be handled. Once a request is started, the memory management unit 25 performs address translation, mapping virtual to physical addresses, using a translation buffer or address cache 31. This lookup in the address cache 31 requires less than one machine cycle (if there is a hit). In the case of a miss in the TLB 31, the memory management circuitry causes a page table entry to be read from page tables in memory and a TLB fill performed to insert the address which missed. This memory management circuitry also performs all access checks to implement the page protection function, etc. The P-cache 14 referenced by the memory management unit 25, as described below, is a two-way set associative writethrough cache with a block and fill size (cache line) of 32-bytes. The P-cache state is maintained as a subset of the backup cache 15. Memory requests received by the memory management unit 25 but for which a miss occurs in the primary cache 14 are sent to the cache controller unit 26 for execution. The memory management unit 25 receives invalidates and fill data from the cache controller unit 26.

The cache controller unit 26 is the controller for the backup cache 15, and interfaces to the external CPU bus 20. The cache controller unit 26 receives read requests and writes from the memory management unit 25, and sends primary cache 14 fills and invalidates to the memory management unit 25. The cache controller unit 26 ensures that the primary cache 14 is maintained as a subset of the backup cache 15 by the invalidates. The cache controller unit 26 receives cache coherency transactions from the bus 20, to which it responds with invalidates and writebacks, as appropriate. Cache coherence in the system of FIG. 1 is based upon the concept of ownership; a hexaword (16-word or 32-byte) block of memory may be owned either by the memory 12 or by a backup cache 15 in a CPU on the bus 11—in a multiprocessor system, only one of the caches, or memory 12, may own the hexaword block at a given time, and this ownership is indicated by an ownership bit for each hexaword in both memory 12 and the backup cache 15 (1 for own, 0 for not-own). Both the tags and data for the backup cache 15 are stored in off-chip RAMs, with the size and access time selected as needed for the system requirements. The backup cache 15 may be of a size of from 128K to 2Mbytes, for example. With access time of 28-nsec, the cache can be referenced in three machine cycles, assuming 10-nsec machine cycle for the CPU 10.

Figure 3:
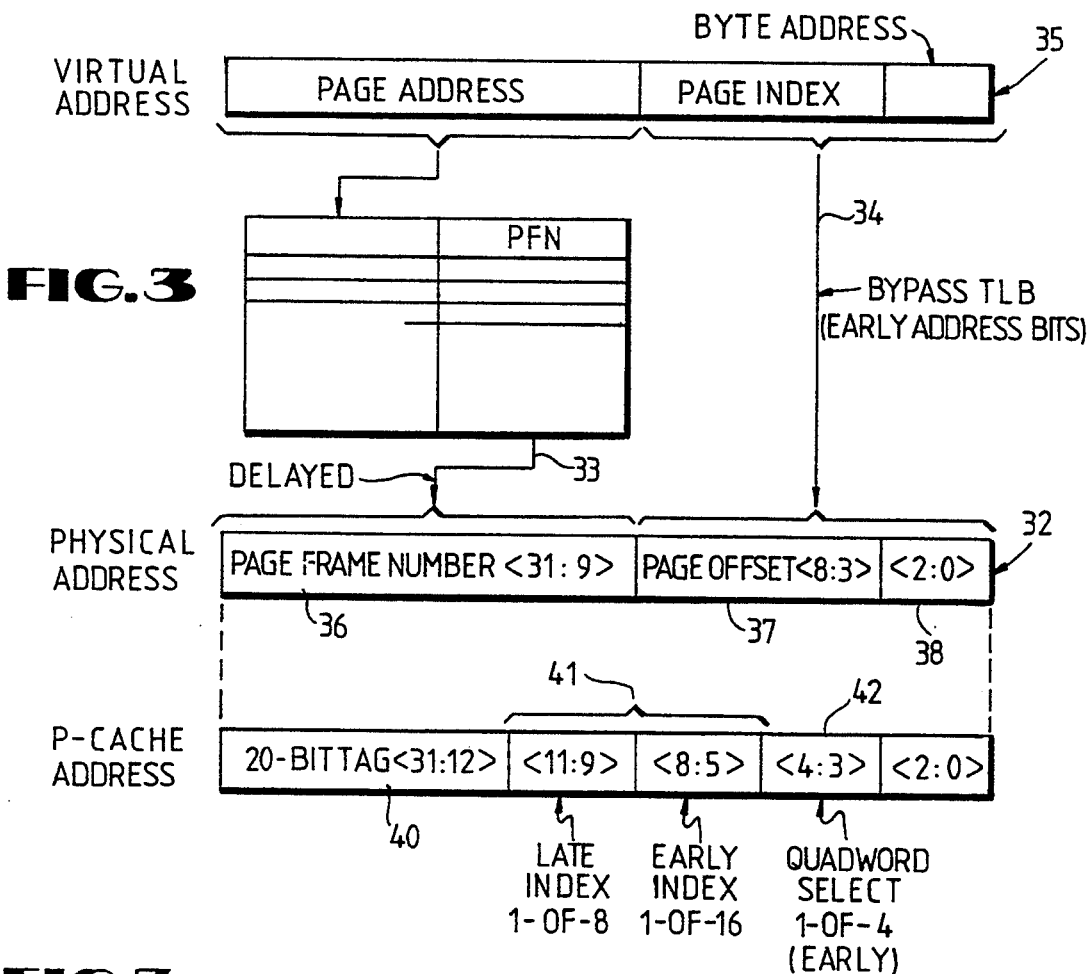
FIG. 3 is a diagram of the format of the virtual and physical addresses and the cache addressing in the computer system of FIG. 1.

Referring to FIG. 3, the physical address 32 on lines 33 and 34 at the output from the TLB 31 (including the bypass lines 34 from the virtual address 35) is a 32-bit value including a 22-bit page frame number 36 consisting of bits <31:9>, functioning to select one of 4 M pages, where each page is 512-bytes. A 6-bit page offset 37 consists of bits <8:3> selecting 1-of-64 quadwords in a page. A 3-bit byte address 38, bits <2:0>, selects 1-of-8 bytes in a quadword. This partition of the physical address is for pages of 512-bytes. Other page sizes could be implemented, such as 1K- or 4K-bytes, in which case the page frame number is of fewer bits and the page index 37 is correspondingly larger. The PFN field 36, bits <31:9>, is the part of the virtual address that is passed through the TLB 31 in the M-box 25 for translation, however, and so these bits are delayed, compared to the bits <8:0> which bypass the TLB 31 via lines 34 and are available immediately for accessing the P-cache 14. In the configuration of the primary cache 14 of the example embodiment, the tag 40 is 20-bits wide (bits <31:12>) and the index field 41 is 7-bits wide (bits <11:5>), as illustrated in FIG. 3. The index 41 is thus partly made up of bits <8:5> available early in the address cycle, because these bits bypass the TLB 31, and partly of bits available later in the cycle, bits <11:9>, which come from the TLB on lines 33 as the lower bits of the PFN 36. A quadword select field 42 made up of bits <4:3> is in the early part of the page offset on lines 34 and is used to select among four quadwords in the data storage array.

Figure 4:
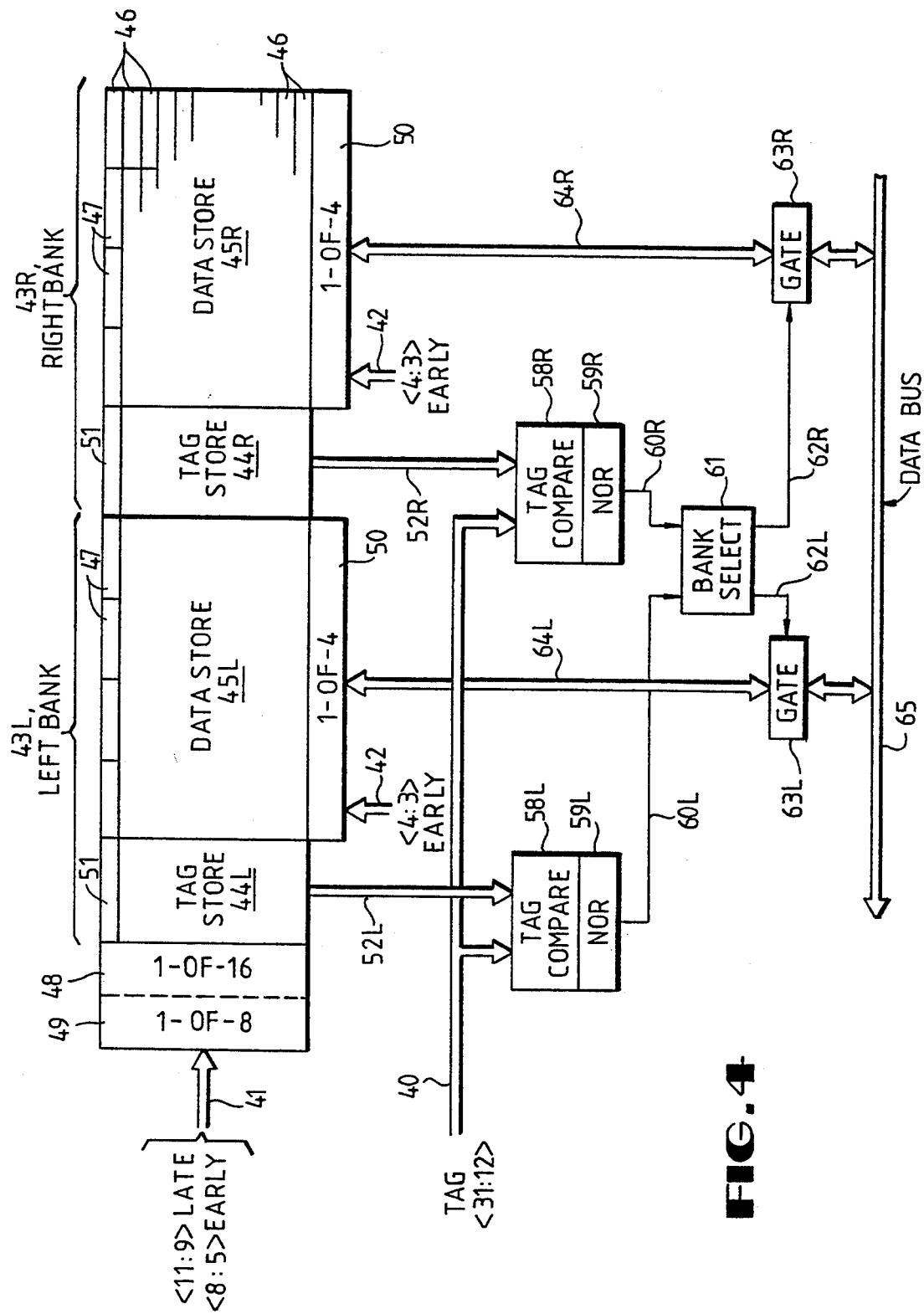
FIG. 4 is an electrical diagram in block form of the primary cache in the CPU of the system of FIG. 1, according to one embodiment of the invention.

Referring to FIG. 4, the primary cache 14 is depicted (in logical format) as configured in two identical banks, a left bank 43L and a right bank 43R, where in each bank there is a tag store 44L or 44R and data store 45L or 45R. In each bank, there are 128 indexes or rows 46, each index containing eight quadwords 47 of data (four for each bank), with a quadword being 64-bits or eight bytes. This cache size for the primary cache 14 in the example is thus 128×8×8 or 8-Kbyte of data (plus tags, etc.). The row (index) decode performs a 1-of-128 selection, but this is done in two stages; first a 1-of-16 selection is made in each of eight partitions of each bank of the cache, using sets of eight 1-of-16 decoders 48 driven by the early bits <8:5> of index 41. Then, when the late bits <11:9> of index 41 arrive, a second decode is done by sets of 1-of-8 selectors 49 responsive to these late bits. A 1-of-4 selection using early bits <4:3> is performed by sets of decoders 50 to select one of the quadwords 47 for each bank for an index. For a read, the eight sets of read data are available (in each bank) at the outputs of the decoders 48 early because the early bits <8:5> are used, speeding up the overall data access because the cache access at least partly occurs while the TLB access is being accomplished. The tag store 44L or 44R is accessed simultaneously with the data store 45L or 45R, when an index 46 is selected. Each of the 128 indexes or rows 46 contains a 20-bit tag 51 in each bank. The same decoders 48 and 49 are used to select a tag 51, at the same time the data store is accessed. A 20-bit tag 51 is thus available at an output 52L or 52R from the tag store for each bank soon after the PFN 36 is available on bus 33 from the TLB 31, since only a 3-bit, 1-of-eight, decode is needed to be done by late bits and the early bits have already been used to do an array access up through the eight outputs of the decoder 48 (in each bank).

In FIG. 5, the configuration of the memory cell array and selectors making up the data and tag store of FIG. 4 is depicted in a pictorial view to illustrate the nesting of the selectors 48, 49 and 50. The array construction is of the type employing super bit lines as disclosed in copending application 508,082, filed Apr. 11, 1990, by Harold Partovi and Michael Case, assigned to Digital Equipment Corporation, the assignee of this invention. A seen in FIG. 5, each of the 1-of-16 selectors 48 is connected to sixteen memory cells 53 in the cell array, and one of the 1-of-4 selectors 50 spans four of these 1-of-16 selectors 48. One of the 1-of-8 selectors 49 spans eight of the 1-of-4 selectors 50, and there are sixty-four of these 1-of-8 selectors 49 in each of the left and right banks 45L and 45R, for data (plus parity, valid bits, etc.). Only the 1-of-8 selectors 49 use the late bits <11:9>, so the array access is completed using the early bits up through the 1-of-16 and 1-of-4 selectors 48 and 50. The tag store 44L and 44R is generally the same as the data store, but does not need the 1-of-4 selectors 50, and only contains 20-bits or twenty sets of the 1-of-8 selectors 49 for each tag, there being one 20-bit tag per bank and two banks.

Referring to FIG. 6, a single index or row 46 (cache line) of the tag store and data store together is a 627-bit value 54 containing in each of the left and right banks a 20-bit tag 51 with a 1-bit tag parity 55, and four quadwords 72 of cache data with a parity bit for each byte (4×(64+8)), plus four valid bits 56 (one for each quadword of data 47). An allocation pointer bit 57 is included for each index. The tag parity bit 55 is accessed along with a tag 51, and parity of the tag is checked by circuitry operating in parallel with the tag data path, but not shown or described here as it is of conventional construction. Likewise the valid bits 56 are set or checked by logic circuitry in parallel with the data access, by circuitry of the same general form as illustrated for the data access. The allocation pointer bit 57 is used to implement a not-last-used replacement algorithm; if a cache miss occurs, the issue is presented of which one of the two possible sets of four quadwords 47 (left or right bank) sharing this index 46 will be overwritten in the cache. An algorithm is implemented using the contents of the bit 57 for the two banks, left and right, to make this decision, but this occurs during a cache refill operation and is not of concern in the present invention which is concerned with the cache hit or miss decision.

In FIG. 4, the tag outputs on lines 52L and 52R from tag store 44L and 44R are applied to match (compare) circuits 58L and 58R, which also receive the tag 40 via lines 33 from the TLB 31. Each of these circuits 58L and 58R produces a set of twenty match bits as input to a NOR logic circuit 59L or 59R, which in turn produce miss signals on lines 60L and 60R as inputs to a bank select circuit 61. The bank select circuit produces a left bank select signal on line 62L, or a right bank select signal on line 62R, but not both, and these signals are used by gates 63L and 63R to couple lines 64L or 64R to the data bus 65 going to the memory management unit 25.

Figure 7:
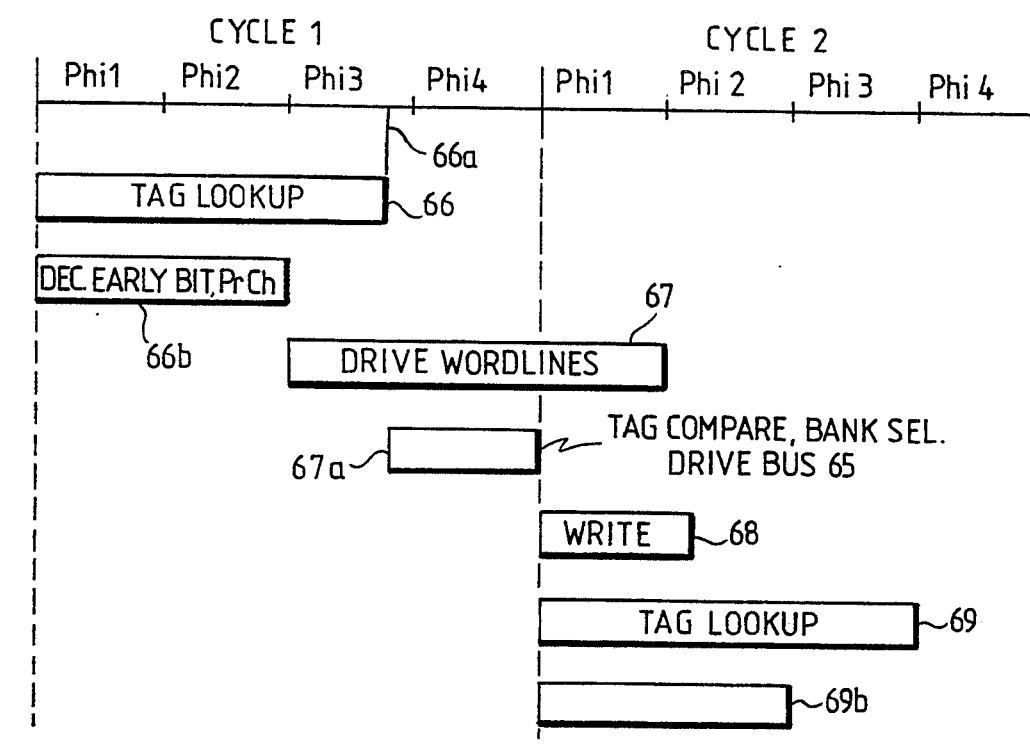
FIG. 7 is a timing diagram showing events vs. time for operation of the cache of FIGS. 4 and 5.

Referring to FIG. 7, the timing of a memory cycle is illustrated to show a cache compare and access in one embodiment of the invention. During a period 66 occupying phi1, phi2 and part of phi3 of a first cycle, a lookup in TLB 31 is occurring, with the tag being available on the lines 33 at time 66a. During an early part 66b of this period 66, a decode operation in selectors 48 using the early bits <8:5> is occurring, occupying phi1 and phi2 of this first cycle. At time 66a, the late bits and the tag become available on lines 33, and during a time period 67 the wordlines of the array are being driven. In a period 67a (mostly in phi4) within this time 67 the decode is completed in the 1-of-8 selectors 50 and the compare and bank select operation is accomplished in circuits 58L and 58R, 59L and 59R and 61. At the end of the compare operation in period 67a, the bus 65 is driven with the output of the selected left or right bank of the cache data store 45L or 45R via lines 64L or 64R and gates 63L or 63R, assuming a cache hit is detected in a read operation. If a write operation is signalled instead of a read, the write to the selected left or right bank is accomplished during a period 68 in phi1 of the second cycle, which is within the period 67 that the wordlines are driven. A new access cycle can begin during another TLB lookup period 69, and period 69b for this access is for decode of early bits, corresponding to periods 66 and 66b of the just-completing access cycle.

Figure 8:
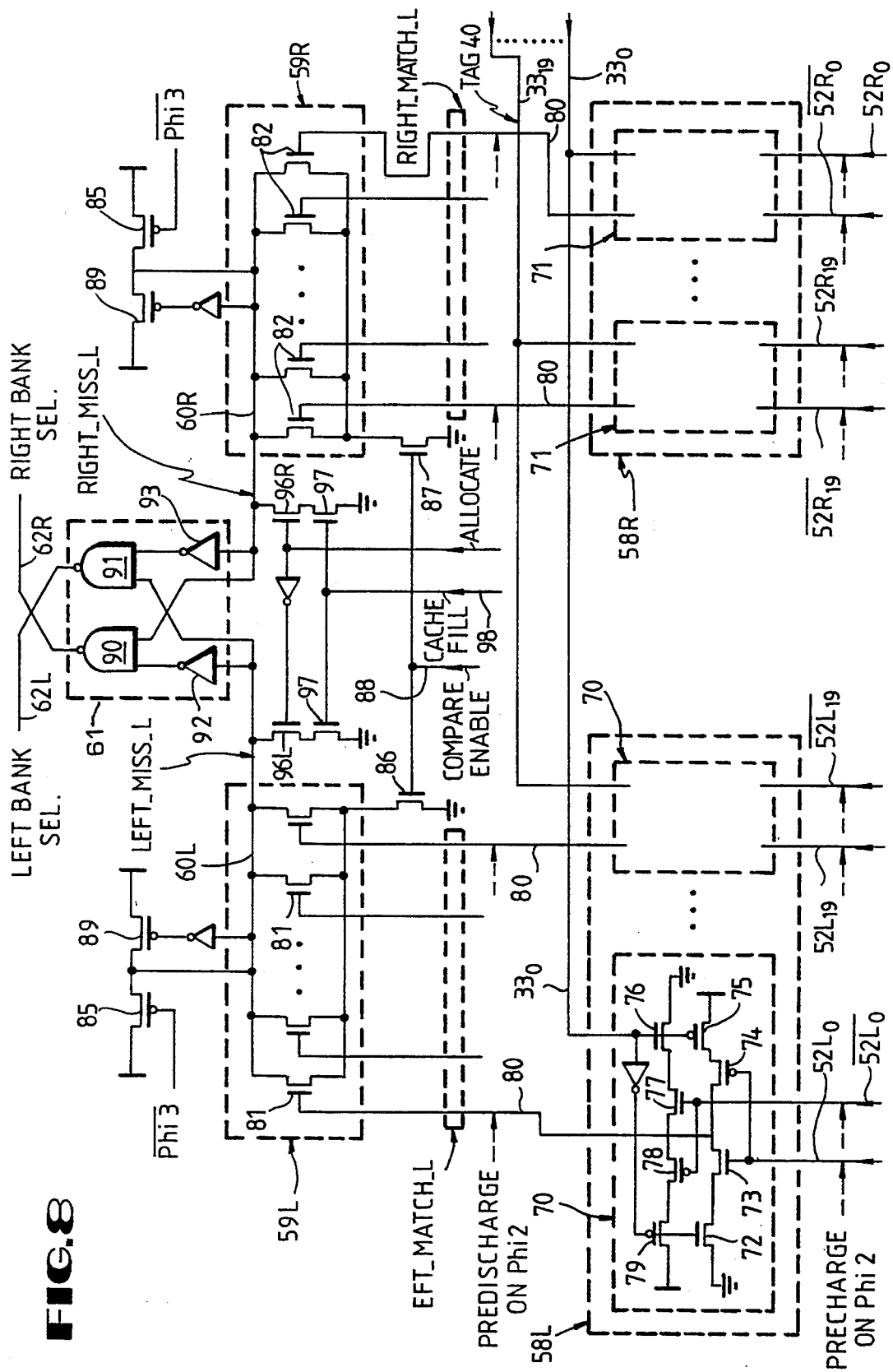
FIG. 8 is an electrical diagram of the tag match and bank select circuits of the cache controller of FIG. 4.

Referring to FIG. 8, the compare circuits 58L, 58R, NOR circuits 59L, 59R, and bank select circuit 61 are shown in detail according to one embodiment of the invention. For the left bank, a set of twenty tag bit compare circuits 70 are employed, and for the right bank, a set of twenty tag bit compare circuits 71 are likewise employed. The tag 40 received from the TLB 31 via lines 33 is one input to all of these compare circuits 70 and 71 on lines $33_0$–$33_{19}$. Each compare circuit 70 receives one of the dual-rail outputs from one of the left bank tag data store array slices on one of twenty sets of lines 52L. Likewise, each compare circuit 71 receives one of the dual-rail outputs from one of the right bank tag data store array slices on one of twenty sets of lines 52R. Each compare circuit 70 or 71 is a CMOS exclusive OR circuit having serially-connected P-channel transistors 72 and 73 and N-channel transistors 74 and 75 in one group, and serially-connected P-channel transistors 76 and 77 and N-channel transistors 78 and 79 in a second group. Outputs from the match circuits 70 and 71 are on lines 80 going to the NOR gates 59L and 59R. If a line $52L_0$ is high and the line $52L_0$-bar low, and line $33_0$ high, transistors 74 and 75 will be on and all other pairs of transistors will have one transistor off, so the output line 80 for this particular match circuit 70 is pulled low, indicating a match. Similarly, if the line $52L_0$ is low and the line $52L_0$-bar high, and line $33_0$ low, transistors 78 and 79 will be on and all other pairs of transistors will have one transistor off, so again the output line 80 for this circuit 70 is pulled low, indicating a match. The other two possible combinations (line $52L_0$ low and line $52L_0$-bar high, or line $52L_0$ high and line $52L_0$-bar low), cause this line 80 to be pulled high through transistor pair 76, 77 or pair 72, 73, indicating a not-match for this tag bit. All of the lines 52L and 52L-bar, and 52R and 52R-bar, are precharged to Vdd during phi2 and driven in phi3, while all lines 80 are predischarged to ground during phi2 (in response to lines 52/52-bar precharging to Vdd), and driven in phi4. The lines 80 are all predischarged (grounded) when all of the lines 52L, 52L-bar, etc., are precharged to Vdd because paths to ground are established by transistor pairs 72, 73 or 76, 77 regardless of whether the line 33 for this bit is one or zero; this predischarging of lines 80 is part of the self-timing operation of the circuit.

The twenty lines 80 for each bank, outputs of the match circuits 58L and 58R of FIG. 8, are connected to the gates of two sets of twenty transistors 81 or 82 which comprise the N-channel NOR gates 59L and 59R for the left and right banks. These gates are held low during phi2, the predischarge period, and one or more go high in phi4 if a not-match occurs. The drains of each set of transistors 81 or 82 are connected to output lines 60L and 60R, which are separately precharged to Vdd during phi3 by P-channel transistors 85. The sources of the sets of transistors 81 and 82 are connected to Vss by current limiting transistors 86 and 87. The gates of the transistors 86 and 87 are driven by a compare-enable signal on line 88, going high sometime in phi4. The output line 60L is pulled low during phi4 if one or more of the lines 80 for this left bank is high during phi4, indicating a miss (the tag 40 on lines 33 is not equal to the stored tag 51 on lines 52L). Similarly, the output line 60R is pulled low during phi4 if one or more of the lines 80 for this right bank is high during phi4, indicating a miss (the tag 40 on lines 33 is not equal to the stored tag 51 on lines 52R). The lines 60L or 60R stay high in phi4 when all the transistors 81 or 82 stay off (all twenty lines 80 low for the bank), indicating a hit or tag match for the left or right banks. The lines 60L or 60R are held high by high-impedance P-channel transistors 89 having gates driven by inverters, or allowed to stay low by these transistors.

Figure 9:
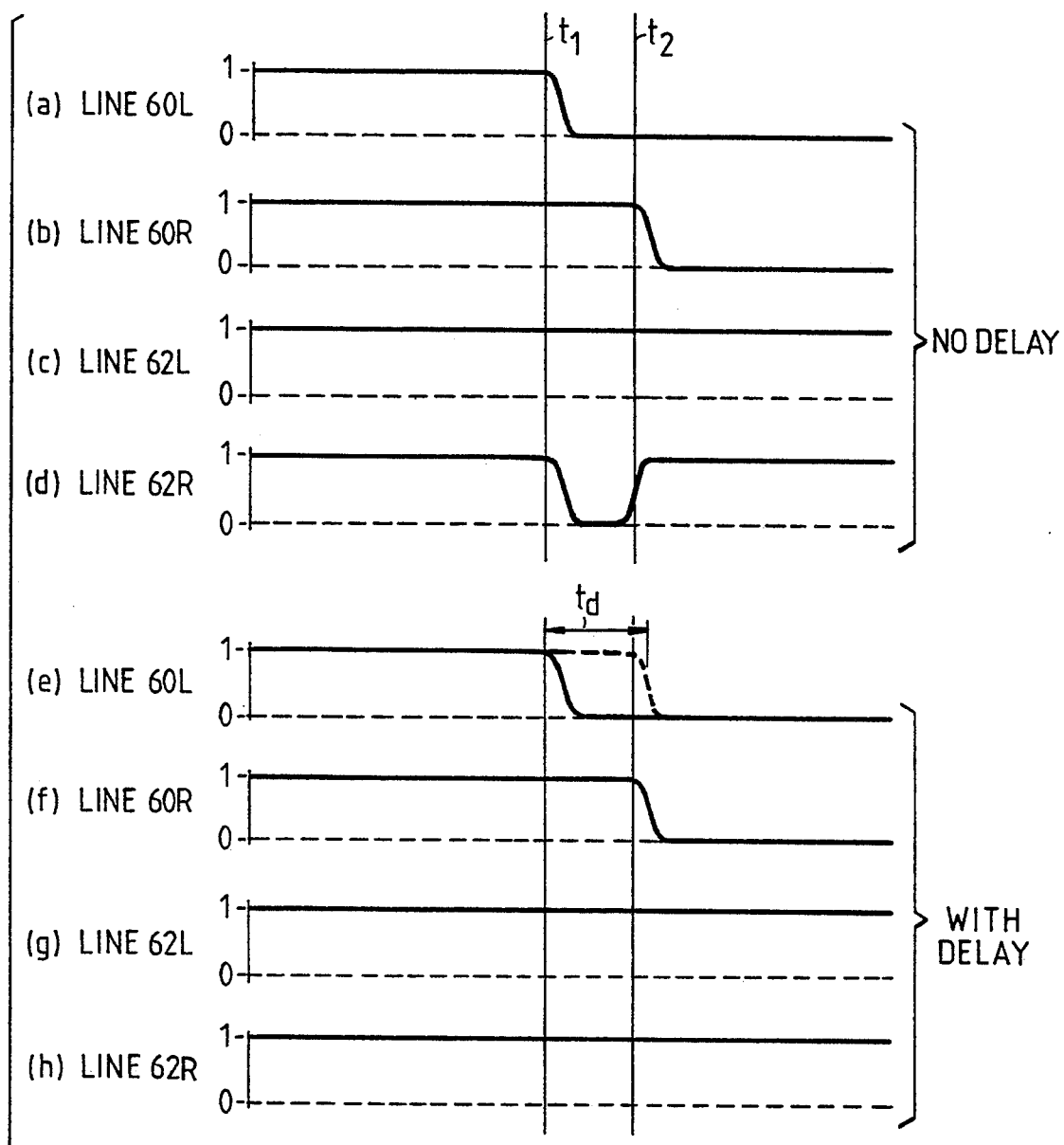
FIG. 9 depicts eight timing diagrams (a)-(h) showing voltage vs. time for events occurring in the bank select circuit of FIG. 8, according to one embodiment.

The bank select circuit 61 includes two NAND gates 90 and 91, with two inverters 92 and 93, as seen in FIG. 8. The gate 90 receives the inverted miss (active low) output on line 60L, and the miss (active low) output on line 60R, and produces a right-bank-select output on line 62R (active low). The gate 91 receives the miss (active low) output on line 60L, and the inverted miss (active low) output on line 60R, and produces a left-bank-select output on line 62L (active low). The inverters 92 and 93 provide a delay for one of the inputs of each NAND gate 90 or 91. A bank hits if its line 60L or 60R does not signal a miss (i.e., stays high) within a delay window (defined by inverter 92 or 93) of a miss signal on the other line 60L or 60R produced by the opposite bank. The inverters 92 and 93 are required for the bank-select logic implemented (i.e., selecting which bank to access for a given address), and also function as delay elements which provide a margin if the signals on lines 60L and 60R are miscued (skewed in time). For example, this margin can offset a miscue which could result in a momentary (and erroneous) selection of a bank, although both banks finally miss. Consider the situation where it is assumed there is no delay in the inverters, and miss signals appear on lines 60L and 60R as seen in FIGS. 9a and 9b; the miss signal drops to active-low at time $t_1$ for the left bank, line 60L, but does not drop until $t_2$ for line 60R. The left bank select line 62L stays high throughout as seen in FIG. 9c, because the gate 91 at no time sees highs at both inputs (as needed to produce a low output). The fight bank select line, seen in FIG. 9d, exhibits erratic behavior, however, showing a false "hit" between $t_1$ and $t_2$ while line 60R is high and line 60L is low, since gate 90 during this period sees two high inputs, producing a low output. This false hit signal of FIG. 9d will couple false data onto the bus 65 via gate 63R. Taking into account the delay introduced by the inverters 92 and 93, however, this false hit signal is eliminated, as seen in FIG. 9e–9h, assuming the delay $t_d$ of each inverter 92 or 93 to be the period $t_2-t_1$. Here the gate 90 never sees two high inputs, since the drop in the voltage on line 60L is delayed by time period $t_d$. The delays provided by the inverters thus allow a margin of self-timing (timing one bank against the other), as distinguished from requiring a clock edge to define the window for the bank selector to be responsive to the signals on lines 60L and 60R. The current limiting transistors 86 and 87 also aid in timing because the voltage on line 60L or 60R will fall at about the same rate regardless of whether one or twenty of the transistors 81 or 82 are turned on.

The conditions of the outputs 62R and 62L for various inputs are as set forth in the following Table:

| Left Tag Line 60L | Right Tag Line 60R | Left Bank Select Line 62L | Right Bank Select Line 62R |
| --- | --- | --- | --- |
| High | High | High | High |
| High | Low | Low | High |
| Low | High | High | Low |
| Low | Low | High | High |

Note that neither bank is selected (lines 62R and 62L both high) when both left and right tags indicate a hit (both lines 60L and 60R high). This is a condition where the same tag is stored in both left and right banks, and is an anomalous situation most likely indicating an error. Thus, a miss condition should be signalled, since it is likely the two quadwords of data stored for this tag are inconsistent; neither should be used, and so both lines 62L and 62R signal a miss and the gates 63L and 63R are disabled and no data is transferred between the cache I/O lines 64L or 64R and the bus 65.

For a cache fill operation (after a cache miss), the left or right bank is allocated by an allocate-control line 95 applied to the gates of transistors 96L and 96R, which selectively ground either lines 60L or 60R via transistors 97 gated on by a refill-control line 98. In this manner, either the left or right bank is disabled, holding a line 60L or 60R in the miss condition and preventing the line 62L or 62R for that bank from turning on the gates 63L or 63R for one bank. The bank select for the other bank will be a forced hit (compare-enable is turned off), however, producing a bank select signal on line 62L or 62R for a hit, and allowing data to be written in through one of the gates 63L or 63R.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A tag compare circuit for detecting comparison of tags in a set-associative cache having a plurality of banks, comprising:
    first and second comparators, each of the comparators receiving a tag value from a processor, said first comparator receiving a first stored tag for a first of said plurality of banks and producing a plurality of first match-bit signals, said second comparator receiving a second stored tag for a second of said plurality of banks and producing a plurality of second match-bit signals, the tag value, the first stored tag and the second stored tags, each including multiple address bits;
    first and second NOR gates, the first NOR gate receiving said first match-bit signals at a plurality of inputs and producing a first output responsive to whether all of said first match-bit signals indicate a match between all bits of said tag value and said first stored tag, the second NOR gate receiving said second match-bit signals at a plurality of inputs and producing a second output responsive to whether all of said second match-bit signals indicate a match between all bits of said tag value and said second stored tag;

a bank selector receiving said first and second outputs, said bank selector generating a first bank select signal to said first bank if said first and second outputs indicate that said tag value matches said first stored tag and does not match said second stored tag, said bank selector generating a second bank select signal to said second bank if said first and second outputs indicate that said tag value matches said second stored tag and does not match said first stored, said bank selector including first and second NAND gates and first and second inverters, said first output being connected to an input of said first NAND gate and connected through said first inverter to an input of said second NAND gate, said second output being connected to an input of said second NAND gate and connected through said second inverter to an input of said first NAND gate, each of said first and second inverters introducing a delay to provide a margin in self-timed paths of signals on said first output of said first NOR gate and said second output on said second NOR gate.

2. A circuit according to claim 1 wherein said bank selector includes first and second gates for generating said first and second bank select signals, said first gate receives said second output through a delay element, and said second gate receives said first output through a delay element.

3. A circuit according to claim 1 wherein said first output of said first NOR gate is precharged prior to said first match-bit signals being valid and said second output of said second NOR gate is precharged prior to said second match-bit signals being valid.

4. A circuit according to claim 1 wherein said first NOR gate is comprised of N-channel transistors having gates connected to receive said first match-bit signals and having source-drains paths in series with a first current limiting transistor and said second NOR gate is comprised of N-channel transistors having gates connected to receive said second match-bit signals and having source-drains paths in series with a second current limiting transistor.

5. A circuit according to claim 4 wherein each of said first current limiting transistor and said second current limiting transistor is gated on by a compare-enable signal.

6. A circuit according to claim 1 wherein said first match-bit signals are predischarged prior to said first stored tag being valid at inputs of said first comparator and said second match-bit signals are predischarged prior to said second stored tag being valid at inputs of said second comparator.

7. A circuit according to claim 1 including means for disabling one of said first and second outputs and enabling an opposite bank in order to write to said set-associative cache for a cache fill operation.

8. A circuit according to claim 1 wherein said first comparator includes four first pairs of complementary transistors, each first pair having source-drains paths in series connected between an output node and a terminal of a voltage supply, and gates of each first pair being connected to said tag value or said tag value inverted, and to said first stored tag or said first stored tag inverted and said second comparator includes four second pairs of complementary transistors, each second pair having source-drains paths in series connected between an output node and a terminal of a voltage supply, and gates of each second pair being connected to said tag value or said tag value inverted, and to said second stored tag or said second stored tag inverted.

9. A circuit according to claim 1 wherein said first and second bank select signals are applied to first and second gates, respectively, to connect said first and second banks for data transfer to or from a processor.

10. A method of operating a set-associative cache having a plurality of banks, comprising the steps of:
comparing a tag value received from a processor with a first stored tag received from a first of said plurality of banks and producing a plurality of first match-bit signals;
comparing said tag value with a second stored tag received from a second of said plurality of banks and producing a plurality of second match-bit signals;
generating in a first NOR gate a first output responsive to whether all of said first match-bit signals indicate a match between all bits of said tag value and said first stored tag, the first NOR gate receiving said first match-bit signals at a plurality of inputs;
generating in a second NOR gate a second output responsive to whether all of said second match-bit signals indicate a match between all bits of said tag value and said second stored tag, the second NOR gate receiving said second match-bit signals at a plurality of inputs;
generating either a first or a second bank select signal in response to said first and second outputs, said first and second outputs being received by a bank selector, the bank selector including first and second NAND gates and first and second inverters, said first output being connected to an input of said first NAND gate and connected through said first inverter to an input of said second NAND gate, said second output being connected to an input of said second NAND gate and connected through said second inverter to an input of said first NAND gate, each of said first and second inverters introducing a delay to provide a margin in self-timed paths of signals on said first output of said first NOR gate and said second output of said second NOR gate, said first bank select signal being generated if said first and second outputs indicate that said tag value matches said first stored tag and does not match said second stored tag, said second bank select signal being generated if said first and second outputs indicate that said tag value matches said second stored tag and does not match said first stored tag; and
coupling data to or from said processor from either said first or second banks in response to said first or second bank select signals.

11. A method according to claim 10 including the step of precharging said first output of said first NOR gate prior to said first match-bit signals being valid and precharging said second output of said second NOR gate prior to said second match-bit signals being valid.

12. A method according to claim 11 including the step of predischarging said first match-bit signals prior to said first stored tag being valid at said inputs of said first comparator and predischarging said second match-bit signals prior to said second stored tag being valid at inputs of said second comparator.

13. A method of operating a computer system having a set-associative cache, comprising the steps of:
- comparing a tag value received from a processor in said computer system with a first stored tag received from a first bank of said set-associative cache and producing a plurality of first match-bit signals;
- comparing said tag value with a second stored tag received from a second bank of said set-associative cache and producing a plurality of second match-bit signals;
- comparing said tag value with a second stored tag received from a second bank of said cache and producing a plurality of second match-bit signals;
- generating in a first gate a first output responsive to whether all of said first match-bit signals indicate a match between all bits of said tag value and said first stored tag, the first gate receiving said first match-bit signals at a plurality of inputs;
- generating in a second state a second output responsive to whether all of said second match-bit signals indicate a match between all bits of said tag value and said second stored tag, the second gate receiving said second match-bit signals at a plurality of inputs;
- generating either a first or a second bank select signal in response to said first and second outputs, said first and second outputs being received by a bank selector, the bank selector including first and second NAND gates and first and second inverters, said first output being connected to an input of said first NAND gate and connected through said first inverter to an input of said second NAND gate, said second output being connected to an input of said second NAND gate and connected through said second inverter to an input of said first NAND gate, each of said first and second inverters introducing a delay to provide a margin in self-timed paths of signals on said first output of said first NOR gate and said second output of said second NOR gate, said first bank select signal being generated if said first and second outputs indicate that said tag value matches said first stored tag and does not match said second stored tag, said second bank select signal being generated if said first and second outputs indicate that said tag value matches said second stored tag and does not match said first stored tag; and
- coupling data to or from said processor from either said first or second banks in response to said first or second bank select signals.

14. A method according to claim 13 wherein said first NOR gate and said second NOR gate are each made of N-channel transistors.

15. A method according to claim 14 including the step of limiting current through said N-channel transistors.

* * * * *